United States Patent
Eschenauer et al.

(10) Patent No.: US 8,516,031 B2
(45) Date of Patent: Aug. 20, 2013

(54) NETWORK-BASED SYSTEM FOR SOCIAL INTERACTIONS BETWEEN USERS

(75) Inventors: Laurent Eschenauer, Ougée (BE); Alard Weisscher, Meerssen (NL)

(73) Assignee: Vodafone Holding GmbH, Dusseldorf (DE)

( * ) Notice: Subject to any disclaimer, the term of this patent is extended or adjusted under 35 U.S.C. 154(b) by 233 days.

(21) Appl. No.: 12/842,614

(22) Filed: Jul. 23, 2010

(65) Prior Publication Data
US 2011/0173246 A1    Jul. 14, 2011

(30) Foreign Application Priority Data
Jan. 11, 2010    (EP) .................................. 10150463

(51) Int. Cl.
*G06F 15/16*    (2006.01)

(52) U.S. Cl.
USPC .......................................... 709/201; 709/203

(58) Field of Classification Search
USPC ......... 709/201, 203, 217, 219, 220, 223–226, 709/229; 715/200, 764
See application file for complete search history.

(56) References Cited

U.S. PATENT DOCUMENTS

| | | | | |
|---|---|---|---|---|
| 7,669,123 B2 * | 2/2010 | Zuckerberg et al. | ........... | 715/273 |
| 7,725,492 B2 * | 5/2010 | Sittig et al. | ..................... | 707/784 |
| 7,987,198 B2 * | 7/2011 | Armstrong et al. | ........... | 707/781 |
| 7,991,764 B2 * | 8/2011 | Rathod | .......................... | 707/713 |
| 8,009,433 B2 * | 8/2011 | Ares | .............................. | 361/752 |
| 8,037,093 B2 * | 10/2011 | Tiu et al. | ....................... | 707/781 |
| 8,171,128 B2 * | 5/2012 | Zuckerberg et al. | ........... | 709/224 |
| 8,260,725 B2 * | 9/2012 | Crawford | ...................... | 705/319 |
| 2005/0021750 A1 * | 1/2005 | Abrams | ......................... | 709/225 |
| 2005/0171799 A1 * | 8/2005 | Hull et al. | ......................... | 705/1 |
| 2005/0203801 A1 * | 9/2005 | Morgenstern et al. | .......... | 705/14 |
| 2006/0041543 A1 * | 2/2006 | Achlioptas | ......................... | 707/3 |
| 2006/0117378 A1 * | 6/2006 | Tam et al. | ......................... | 726/3 |
| 2006/0136419 A1 * | 6/2006 | Brydon et al. | ..................... | 707/9 |
| 2007/0150537 A1 * | 6/2007 | Graham | ........................ | 709/203 |
| 2007/0174389 A1 * | 7/2007 | Armstrong et al. | ........... | 709/204 |
| 2007/0192299 A1 * | 8/2007 | Zuckerberg et al. | .............. | 707/3 |
| 2007/0214141 A1 * | 9/2007 | Sittig et al. | ........................ | 707/7 |
| 2007/0282987 A1 * | 12/2007 | Fischer et al. | ................. | 709/223 |
| 2008/0040428 A1 * | 2/2008 | Wei et al. | ....................... | 709/204 |
| 2008/0040474 A1 * | 2/2008 | Zuckerberg et al. | .......... | 709/224 |
| 2008/0040475 A1 * | 2/2008 | Bosworth et al. | ............. | 709/224 |
| 2008/0040673 A1 * | 2/2008 | Zuckerberg et al. | .......... | 715/745 |
| 2008/0070697 A1 * | 3/2008 | Robinson et al. | ............... | 463/42 |
| 2008/0091834 A1 * | 4/2008 | Norton | .......................... | 709/229 |
| 2010/0146443 A1 * | 6/2010 | Zuckerberg et al. | .......... | 715/810 |
| 2011/0138458 A1 * | 6/2011 | Kumar et al. | ................... | 726/15 |
| 2011/0161130 A1 * | 6/2011 | Whalin et al. | ............... | 705/7.18 |

(Continued)

*Primary Examiner* — Sargon Nano
(74) *Attorney, Agent, or Firm* — International IP Law Group, PLLC (57) ABSTRACT

There is provided a system for social interactions between users. The system may include a plurality of network nodes connected in a network, each node comprising a representation of at least one assigned user. The exemplary system comprises a first node assigned to a first user, the first node being adapted to generate an activity upon an execution of an action of the first user with a data object in interaction with the first node. The activity may describe the action in a predetermined format and may include a representation of the data object. The first node may be further adapted to link the activity to at least one second user and to communicate the activity to at least one second node to which the second user is assigned.

14 Claims, 1 Drawing Sheet

(56) References Cited

U.S. PATENT DOCUMENTS

| | | | |
|---|---|---|---|
| 2011/0191417 A1* | 8/2011 | Rathod | 709/204 |
| 2012/0036260 A1* | 2/2012 | Tiu et al. | 709/224 |
| 2012/0066340 A1* | 3/2012 | Armstrong et al. | 709/217 |
| 2012/0069131 A1* | 3/2012 | Abelow | 348/14.01 |
| 2012/0116897 A1* | 5/2012 | Klinger et al. | 705/14.73 |
| 2012/0289208 A1* | 11/2012 | Crawford | 455/414.1 |
| 2012/0289209 A1* | 11/2012 | Crawford | 455/414.1 |
| 2013/0013689 A1* | 1/2013 | Crawford | 709/204 |

* cited by examiner

NETWORK-BASED SYSTEM FOR SOCIAL INTERACTIONS BETWEEN USERS

CROSS REFERENCE TO RELATED APPLICATION

This application claims priority to European (EP) Patent Application No. 10 150 463.7, filed on Jan. 11, 2010, the contents of which are incorporated by reference as if set forth in their entirety herein.

BACKGROUND

Social network services, such as, for example, Facebook, Twitter and LinkedIn, allow for social interactions between their users. Typically, a social network service comprises a representation of each user, which is often configured as a profile including personal details of the user, and it includes the social links between the users. The social links often comprise "friendship" relations or the like, which are established after a confirmation of the users linked to each other.

In addition, social network services allow users to engage in social activities, such as, for example, posting or publishing content for other users of the social network service, sharing existing content with other users and commenting on content published by other users. By means of such activities, social network services allow for a social interaction between its users beyond the provision of personal details of the users.

Usually, social network services of the aforementioned type are provided at social network sites, which are accessed through the Internet or another network. The social network sites are operated by a service provider, which also stores the data of the users of the social network service. Due to the centralized architecture it is required to register with the service provider in order to join a social network service. Furthermore, the social interactions are restricted to one social network site.

If a user whishes to participate in more than one social network service, he may register with each social network site. However, user data and social interactions in one social network site cannot be transferred to another social network site. Thus, a user has to provide his data in each social network site and he has to perform social interactions in each social network site separately. This is very cumbersome for the user.

SUMMARY

Exemplary embodiments of the invention generally relate to so-called social networks allowing for social interactions between users. More specifically, exemplary embodiment may relate to a system and a method for social interactions between users.

A social network service according to an exemplary embodiment may allow its users to perform social interactions with other users independent of a specific social network site.

By way of example, a system for social interactions between users is suggested. The system includes a plurality of network nodes connected in a network, each node comprising a representation of at least one assigned user. In the system a first node assigned to a first user is adapted to generate an activity upon an execution of an action of the first user with a data object in interaction with the first node. The activity describes the action in a predetermined format and comprises a representation of the data object. The first node is further adapted to link the activity to at least one second user and to communicate the activity to at least one second node to which the second user is assigned.

In an exemplary embodiment, a method for social interactions between users is provided. One of a plurality of network nodes is assigned to each user and the nodes are connected in a network. The exemplary method comprises:
generating an activity in a first node assigned to a first user, when the first user executes an action with an object in interaction with the first node, the activity describing the action in a predetermined format and comprising a representation of the data object,
linking the activity to at least one second user, and
the first node communicating the activity to at least one second node to which the second user is assigned.

One exemplary embodiment may relate to a network for social interactions which comprises a plurality of nodes, where to a user one node is assigned. Thereby, an open network is provided for social interactions between its users avoiding the centralization of known social network services and the drawbacks related thereto. In particular, users do not have to register with a specific social network service provider and there is no specific social network site to which social interactions are restricted.

For performing social activities, an exemplary standardized mechanism with a predetermined data format is provided. According to this exemplary mechanism, actions of the users lead to the generation of data items called activities which can be exchanged between the nodes of the network. This allows for social interactions in the network.

The activity comprises a representation of the data object with which the action of the user is performed. The data object may be generated when performing the action or it may be an existing data object which is accessible in the network. For instance, the data object may be a text string of certain format created by the user or it may be a picture, video or similar object the action of the user refers to. The representation of a data object included in an activity may be the data object itself or may be a link to the object, for example.

In one exemplary embodiment of the system and the method, the activity further comprises a verb describing an operation executed with the object. The verb indicates the action the user performs with the object and particularly serves to make the action available to other users of the network. For instance, the action described by the verb may be posting or publicizing the data object, commenting on the data object or similar.

In another exemplary embodiment of the system and the method, the first node is adapted to link the activity to the second user based on a specification of the second user by the first user. This allows for manually linking an activity generated based on an action of a user to another user of the network by specifying the other user manually.

Moreover, in one exemplary embodiment of the system and the method, the first node is configured to determine the second user using a rule stored in the first node, the rule linking the action to the second user based on the object and/or the verb. It may be an advantage of this exemplary embodiment that an activity can be linked to another user automatically by means of a corresponding rule. This disburdens the user from manually specifying the addressee of an activity and ensures that an activity can be made available to other users efficiently.

As already described before, the data object with which the user performs an action from which an activity is generated may be an existent data object accessible in the network. It may be advantageous to inform the owner and/or publisher of the data object about the action performed by the user. Therefore, in one embodiment of the system and the method, the action of the user relates to a data object accessible in the network and the first node being configured to link the activity to a publisher and/or owner of the data object. This mechanism may be specified in a rule stored in the first node.

Rules for linking activities to other users may be predefined. However, in one exemplary embodiment of the system and the method, the rule is provided by the first user and/or by the second user, the second user having transmitted a subscription request to the first node through the second node for providing the rule. This exemplary embodiment allows the first user to create rules for linking activities to other users. In addition or as an alternative, a rule may be created by a second user who whishes to receive activities of the first user similar to a subscription. For this purpose, the second user transmits a corresponding subscription request to the first user, the subscription request installing the rule at the node assigned to the first user.

In order to represent the user in the network, the network node assigned to a user comprises a representation of the user. In one exemplary embodiment of the system and the method, the representation of an assigned user comprises a profile of the assigned user including information on the assigned user and/or the representation of an assigned user comprises relationship data, the relationship data including identification information of further users to which the assigned user has a relationship. The profile allows giving personal details of the user. The relationship data allow a user to establish relationships to other users of the network and to publish relationships to other users. There may be different kinds of relationships which may be specified in the relationship data.

In another exemplary embodiment of the system and the method, the first node is adapted to create a corresponding activity when the profile and/or the relationship data of the first user are changed. This allows informing other users in the network of a change in the profile and/or relationship data of the user.

Activities may be stored in the node assigned to the user who performed an action from which an activity is generated and may be retrieved by other users. As an alternative, they may be transmitted to other users based on rules, as described before.

However, activities are preferably not freely accessible in the network to protect the privacy of the users. Therefore, in one exemplary embodiment of the system and the method, first node is configured to transmit the activity to the second node upon request of the second node and/or based on a rule only after having verified an authorization of the second user to receive the activity, the authorization being specified in the activity. This exemplary embodiment ensures that the privacy of a user can be protected by specifying authorizations to access an activity. Thereby, an access of unauthorized users can be prevented. Advantageously, the authorization of the second user to access the activity is checked when the second user requests the transmittal of the activity or when a rule provides for sending the activity to the user.

Preferably, the access rights for an activity are independent of possible addressees or recipients of the activity. Thus, in one exemplary embodiment of the system and the method, the activity includes at least one recipient user, the first node being configured to transmit the activity to the target user, and wherein the activity further comprises information specifying the users being authorized to receive the activity. The recipient may be specified by the user having performed the action underlying the activity, or the recipient may be determined by means of a rule. If corresponding access rights exist, other users to which the activity is not transmitted may retrieve the activity although they are not the intended recipients.

In order to ensure that activities are not accessed by unauthorized users, an authentication mechanism may be provided. Preferably, authentication is performed on the level of the network nodes. In particular, one exemplary embodiment of the system and the method includes that the first node is adapted to transmit the activity to the second node after having authenticated the second node.

Furthermore, in one exemplary embodiment of the system and the method, to each node at least one client unit is assigned, the client unit being used by the assigned user to access the node. The client may be a software program executed in a user device connected to the relevant network node. Likewise, the client software may be executed in the network node and may comprise a user interface that is provided at the user device.

In one exemplary embodiment of the system and the method, a communication protocol for transmitting the activity to the second node is based on the Extensible Messaging and Presence Protocol (XMPP), particularly the communication protocol is an extension of the XMPP. The XMPP is especially suited since it is developed for the data exchange between nodes in a peer-to-peer network as it is suggested herein. Moreover, the XMPP already provides an authentication mechanism for authentication on the level of the network nodes. A further advantage of the XMPP is that this protocol has been developed for real-time data exchange so that a fast and efficient data transfer between the network nodes is ensured. In addition, the XMPP is an already wide-spread technology and existing XMPP servers and corresponding software only have to be supplemented with the suggested extension in order to enable them to provide the social network service described herein.

Social network sites providing a social network service to a plurality of users having an account with the site, particularly existing social network sites, can also be integrated into the network. Particularly for this purpose, one embodiment of the system and the method includes that the first node comprises a plurality of user accounts and is configured to generate a notification of the action of the first user for communication to at least one user account, and the first node further comprising a translator module adapted to generate the activity from the notification. Due to the translator module, the first node can use another data format and/or communication protocol for the internal data exchange between its users. In particular, this allows a social network site provided by the first node to internally maintain its existent data format and/or communication protocol.

BRIEF DESCRIPTION OF THE DRAWING

The aforementioned and other aspects of the invention will be apparent from and elucidated with reference to the embodiments described hereinafter making reference to the accompanying drawings.

DETAILED DESCRIPTION OF SPECIFIC EMBODIMENTS

Figure 1:
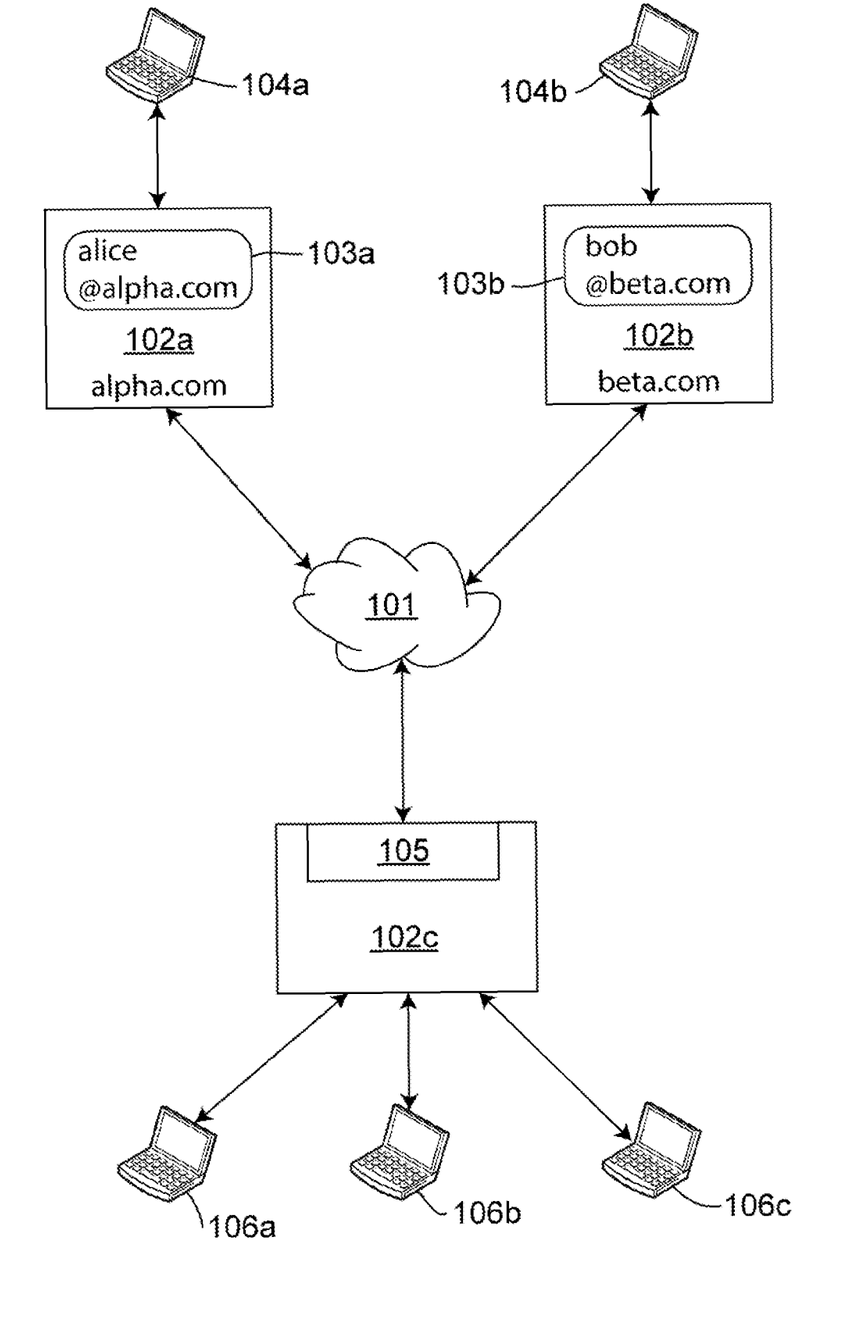
FIG. 1 is a block diagram of network nodes of a network allowing for social interactions of its users according to an exemplary embodiment of the invention.

FIG. 1 schematically shows a network 101 allowing social interactions between users. The network 101 comprises a plurality of network nodes. While the network 101 can include an arbitrary number of network nodes 102a ... c, in FIG. 1 three network nodes 102a . . . c are depicted by way of example. The network 101 may carry the infrastructure for a plurality of services. The information transfer between nodes 102a . . . c of the network may be based on the Internet protocol suite, particularly the TCP/IP (TCP: Transmission Control Protocol; IP: Internet Protocol). In one embodiment, the network 101 is the Internet. However, the network 101 may also be independent from the Internet and/or the Internet protocol suite to practice an exemplary embodiment of the invention.

One service provided in the network 101 allows for social interactions between the users of the service, which is referred to as Social Web herein. Users of the Social Web are also referred to as members hereinafter (i.e., the words user and member are used synonymously). In particular, the Social Web allows its users or members to publish content and/or share content with other users, i.e. to make self-published and/or existing content accessible to other users. This also includes making other users aware of existing content thereby allowing them to see such content. The content may be of any type that can be accessed within a computer network and comprises visual content, such as text, pictures and videos, and audible content. Furthermore, users are enabled to communicate with other users in the network and to interact with the content made accessible by other users. One example of such interaction is a comment of one user relating to content made accessible by another user.

To each user of the network 101 one network node 102a . . . c is assigned, which is called the home node 102a . . . c of the user. One network node 102a . . . c may serve as the home node for one user or a plurality of users. A home node 102a . . . c stores and manages data of its assigned user(s) and users of the Social Web interact with each other through their home nodes 102a . . . c. This means that a user's home node 102a . . . c is configured to make available data for other users and/or to receive data of other users on behalf of its assigned user(s). Thus, when data is to be sent to another user, a network node 102a . . . c transmits the data to the home node 102a . . . c of that user, which then provides the data to the user. Similarly, when data of another user is to be retrieved, a network node 102a . . . c contacts the home node 102a . . . c of that user and the home node 102a . . . c provides the data to the requesting network node 102a . . . c.

For identifying a user in the Social Web or in the network 101 identifiers of a suitable format are used. Preferably, an identifier uniquely identifies the user to which the identifier is assigned in the network 101. Moreover, since information of users is exchanged via the home nodes 102a . . . c assigned to them, the identifier assigned to a user may also identify his home node 102a . . . c. In one embodiment, the identifier of user includes a user name and a server name of the user's home node 102a . . . c, which may be separated by a predetermined sign, such as, for example, the at-sign "@". As an illustrative example, the network node 102a in FIG. 1 is named alpha.com and serves as home node of a user named Alice to which the identifier alice@alpha.com is assigned. The network node 102b is named beta.com and serves as home node for a user named Bob. Thus, to Bob the identifier bob@beta.com is assigned.

The identifier of a user is particularly used as address for sending data to the user or for retrieving data of the user. In the communication between the network nodes 102a . . . c, the server name is used to address the data to be sent or the request for retrieving data. The user name is interpreted locally in the network nodes 102a . . . c to identify the corresponding user and/or his data.

The data of a user are stored in a user account 103a,b in the home node 102a . . . c of the user. The user account 103a,b comprises a database or part of a database in which data of the user are memorized and managed. The user accesses his account 103a,b using a client. In one embodiment, the client is a software program, which is executed in a user device 104a,b connected to the home node 102a . . . c of the user. Likewise, the client software may be executed in the user's home node 102a . . . c and only a user interface is presented in the user device 104a,b. In particular, the client software may be configured as a so called web client which is accessed through a web browser of the user device 104a,b. As an alternative, users may access their home node directly without using a further client device 104a . . . b.

The client enables a user to interact with his user account 103a,b. For instance, the user may manipulate data stored in his user account 103a,b and may execute actions for interacting with other members of the Social Web, such as publishing content for other users or view content published by other users. For this purpose, the client preferably provides a graphical user interface presented to the user. The graphical user interface may provide a component for viewing and managing data of the user and data of others stored in the account 103a,b of a user and for executing actions with the data.

Interactions between users of the Social Web are preferably asymmetric. This means that a user does not have to be logged into his user account 103a,b in the home node 102a . . . c in order to send data to or retrieve data from other members. For this purpose, the data exchange can be controlled by the home node 102a,b without the need for the user to take action. Data received for the user while he is not logged in may be stored in an inbox and may be presented to the user, when he logs in again. Other users may retrieve data also when the user is not logged into his account based on privacy settings without the need for the user to allow or deny the requests, as will be explained in greater detail below.

In the network 101, the network nodes 102a . . . c communicate directly with each other using a standardized communication protocol. The network has a decentralized architecture so that new network nodes 102a . . . c can simply be added. In particular, a new node 102a . . . c does not have to be registered in a central system to join the network 101.

In order to allow for secure exchange of data between users of the network 101 and to protect the user's privacy, the protocol provides a mechanism for securing the communication in the network 101. In one embodiment, the security mechanism is established on the level of the network nodes 102a . . . c. In particular, a network node 102a . . . c authenticates another network node 102a . . . c before data is made available to this network node 102a . . . c. Preferably, a mutual authentication is performed in which each communication partner authenticates the other partner. For authentication a network node 102a . . . c a digital certificate may be assigned to the network node 102a . . . c, and a data exchange is not established unless the digital certificate is successfully validated by the communication partner. Furthermore, the communication between network nodes 102a . . . c may be encrypted in order to create a secure channel protecting the exchanged data from being discovered by unauthorized third parties.

The digital certificates of a network node 102a . . . c may be certified by a certification authority or by a chain of certificates terminating in a certification authority. Thus, the certificate of a communication partner may be validated using the certificate of the certification authority and possible intermediate certificates in the chain. As an alternative, the certificates may be self-signed and validated using other self-signed (trusted) certificates.

In one embodiment, the protocol for the communication between the network nodes $102a \ldots c$ of the network 101 is an extension of the XMPP, which is an XML-based communication protocol (XML: Extensible Markup Language) that is particularly described in the specification RFC 3920 "Extensible Messaging and Presence Protocol (XMPP): Core" of the IETF (Internet Engineering Task Force). Advantageously, XMPP networks have the decentralized architecture of the network 101 and XMPP supports the authentication of network nodes $102a \ldots c$ described before. These core features of the XMPP may be used in the network 101. A further advantage of using the XMPP is its optimization for real-time data exchange which allows for improving performance compared to other communication protocol, such as, for example, HTTP (Hypertext Transfer Protocol).

The data of a user stored in his user account $103a,b$ may comprise a profile of the user. The user profile allows other users to receive information about the user. The profile comprises one data item or a plurality of data items with personal details about the user. The data items of the profile may be text items. In addition, it may be possible to include further kinds of data in the profile, such as image data and audio data. In one embodiment, the profile of a user is generated from a predetermined data structure including fields for the possible data items of the profile. Such fields may be filled by the user, when the user creates his profile. Among the data items may be the name of the user, his contact data including one or more electronic or postal addresses, his language(s), the user's hobbies and/or interests and so forth.

The profiles may be expressed in an XML (Extensible Markup Language) format. In particular, profiles may be based on the Portable Contacts specification which is available under http://portablecontacts.net. As an alternative, profiles may be based on the vCard format particularly defined in the "vCard Format Specification" of the IETF and its XML scheme defined in the specification "vCard XML Schema" of the IETF. In addition to the core features described before, the XMPP also allows for exchanging profile information between network nodes $102a \ldots c$. This feature of the XMPP may also be reused in the Social Web.

Furthermore, the data in a user account $103a,b$ may comprise relationship data allowing establishing and/or publishing relationships to other users of the Social Web. For each relationship to one other user, the relationship data may include one data item. This data item specifies the other user using his identifier. Moreover, a relationship data item may specify the kind or type of the relationship. For this purpose, an extensible set of predefined types of relationships with given properties may be provided. In one embodiment, the types of relationships include those types defined by the XHTML Friends Network (XFN) under http://gmpg.org/xfn. Examples of types of relationships may be "contact" (someone the user knows how to get in touch with), "friend" (someone the user is a friend to), "co-worker" (someone the user works with, or works at the same organization as), "kin" (a relative, someone the users considers part of his extended family), "muse" (someone who brings the user inspiration) and similar. Properties of the relationship may be symmetry, i.e. whether each part has the same relationship to the other part (symmetric relationship) or not (asymmetric relationship), and transitivity, i.e. whether a relationship between A and B and the same relationship between B and C implies that also A and C have this relationship (transitive relationship) or not (non-transitive relationship).

While the relationships described before have bilateral character, relationship data may also be used to form groups of users in the network 101. Here each member of a group may include a data item in his relationship data that reflects his membership of the group. The data item may have the type "member of <group identity>". The group identity preferably identifies the group uniquely. For this purpose, the group identity may include a group name and the identity of one or more founders of the group, i.e. users who establish the group.

While the user can arbitrarily specify the data items of his user profile, there may be a confirmation mechanism for relationship data in which the other part confirms a relationship. In this mechanism, a home node $102a \ldots c$ of a user may send a request for establishing a relationship of certain type to the other part, and the other part may confirm the relationship by sending an affirmative answer. Upon receiving the affirmative answer, the home node $102a \ldots c$ may include the relationship between the user and the other part in the relationship data of the user as one relationship data item. When no affirmative answer is received, the home node $102a \ldots c$ may not include the relationship in the relationship data of the user. Such a confirmation mechanism may be provided for in connection with predetermined types of the relationships. In particular, symmetric and/or transitive relationships may be confirmed, since such relationships imply a specific social connection to the other part.

Profile data and relationship data stored in a user account $103a,b$ of a user in his home node $102a \ldots c$ may be viewed by another user of the Social Web upon request. However, an access control may be executed in connection with the data stored in the user account $103a,b$. For this purpose, access rights may be assigned to the user data defining conditions for accessing the user data. Preferably, individual access rights can be defined for each data item of the user data. Thus, different access rights can be defined for different part of the profile and/or relationship data of a user. However, data items may be included in sets of data items having the same access rights. Hereby, the user can flexibly adapt the access rights to his specific needs.

The access rights may define who can access a data item. In this regard, the authorization can be restricted to specific members of the Social Web or to groups of members, which may be specified by the user owning the data item. Authorized members may be selected from the relationship data stored in a user account and groups of authorized members may be specified as such members to which the user has a relationship of certain type. Thus, the user can authorize his "friends" or "kins" to access certain data items of his user data. However, the authorized members may also be specified independently from the relationship data of the user. The user may give access rights to members which are not included in his relationship data and he may define groups of authorized members which are independent of relationships in his relationship data.

In addition, the access rights may define further conditions for accessing one or more data items of the user data. For instance, the user may define time periods for accessing a data item. Or the user may prescribe that a data item can only be accessed after a user-defined password has been entered by the member requesting access to the data item. Moreover, it can be provided that access to a data item is not granted unless the user allows access through his client.

Based on the access rights specified for the data items of the user data, the home node $102a \ldots c$ of the user checks whether requests for accessing user data meet the access criteria defined in the access rights or not. In one embodiment, the access rights are hidden. This means that the access rights can only be viewed by the owner of the protected data and not by other members of the Social Web. Thus, a member who wishes to request user data of another user does not know whether he is permitted to access the requested data unless the request is answered by the home node 102a . . . c of the other user. By hiding the access rights, privacy of the user is improved since other users cannot see who is allowed to access the user data and thereby gain information about authorized users.

Preferably, a member who wishes to view user data of another user of the network 101 may operate his client to instruct his home node 102a . . . c to generate a corresponding request. The request may include the identifier of the member and it may specify which data items are requested. For instance, the request may relate to the profile of the user, to the relationship data of the user or to both. As address of the request, the identifier of the user whose user data is requested is used. The request is transmitted from the home node 102a . . . c of the member to the home node 102a . . . c of the other user. The other user's home node 102a . . . c then determines the requested data items and accesses the access rights linked to theses data items. The access rights are then used to check whether the member is permitted to access the requested data items. If the check is affirmative, the requested data items are transmitted to the home node 102a . . . c of the member who requested the user data. Otherwise the request is rejected.

The user profile and the relationship data described before include data which are in general slowly changing. They provide basic information of the user and can be retrieved by other users of the network 101. However, these data do not allow the user to actively interact with other users in the network 101. For enabling a user to interact with others in the network, a further type of data is provided, which is referred to as activities herein. An activity is a data item describing an action a user performs with an object. In general, any suitable definition of such a data item may be used in the network. One possible implementation of activities is the XML-based Activity Streams format described under www.activitystrea.ms, particularly in the specifications "Atom Activity Extensions" and "Atom Activity Base Schema" available on the aforementioned web page.

Preferably, an activity at least comprises a subject, a verb describing the action performed by the user and at least one object the user performs the action with. The subject specifies who performs an action. In the network 101 this is the user executing the action with an object. In an embodiment, an activity can comprise several objects an action is performed with in order to facilitate the description of actions involving more than one object.

With regards to objects of activities a set of objects types may be provided defining the types of objects which can be included in an activity. For instance, one or more of the object types defined in the specification "Atom Activity Base Schema" may be used, which are currently the following: Article (an article, such as a news article, a knowledge base article or similar), Blog Entry (an entry in blogs or similar), Note (a short-form text message), Status (an update of the author's situation, mood, location or other status), File (a document or other file), Photo (a graphical still image), Photo Album (a collection of images), Playlist (an ordered list of time-based media items, such as video and audio objects), Video (video content, usually including a motion picture track and an audio track), Audio (audio content), Bookmark (a point to a URL (Uniform Resource Locator), typically a web page), Group (a group of users in the Social Web or another social network), Place (a location on Earth) and Event (an event that occurs in a certain place during a particular interval of time). Further object types may likewise be provided.

The object of an activity may be included the activity. This is particularly useful, when the object consists of text. As an alternative, an object may be represented in an activity by a link pointing to a resource in the network 101 including the object. For instance, the link may be an address of a web page or a directory, which can be accessed through the network 101. Thus, the activity and the object can be transmitted to another user separately. Likewise, the activity and its object may be transmitted together. In this case, as a representation of the object the activity includes a reference to the accompanying object.

Preferably, there is also provided a set of possible verbs which can be included in an activity. Again, the set may comprise one or more of the verbs defined in the specification "Atom Activity Base Schema", which are currently the following verbs: Post (posting or publishing an object in the network), Share (call out/draw attention to an existing object), Save (call out an object as being of interest for the user himself, used for saving objects in the user account), Mark as Favorite (marking an object as an item of special interest), Play (indicates that the user spent some time enjoying the object, e.g. that the user watched all or part of a video), Start Following (indicates the that user began following the activity of the object), Join (indicates that the user has become a member of the object), Tag (indicates that the user has identified the presence of a target inside another object). Another possible verb may be Create Relationship (establishing a relationship to another user). Further verbs may likewise be provided.

In addition to a verb and an object, an activity may comprise further components. One such component may be a target specifying the object an action was done to. For instance, in connection with the verb "post" the target may specify the collection (i.e. a blog, a photo album or similar) in which the object is posted. Furthermore, an activity may include one of the extension elements defined in the specification RFC 4685 "Atom Thread Extensions" of the IETF, particularly an in-reply-to element. The existence of an in-reply-to element indicates that an object is a response to a further object, the in-reply-to element. Using this element allows the user to reply or comment to a further object, such as, for example, a blog post or photo published by another user.

A user may perform an action with an object using his client. For this purpose, the client node may offer a graphical user interface which provides functionalities for performing actions in accordance with the predefined verbs. Preferably, the graphical user interface offers typical actions based on the current context, the user is viewing in the graphical user interface. If the user currently inspects an object of a specific type published by another user, the graphical user interface may offer an actuator for performing possible actions in view of that object.

When performing the action, the user also specifies through the client an item which is the object of the activity and possibly further items which form further elements of the activity, such as a target and/or another extension element. The target may be an external link. If the item includes text, this text may be generated by the user in the graphical user interface. Items, which are not text, may be selected by the user through the graphical user interface of the client. Here, the user may select items he is currently inspecting, or he may select items which have been stored in the user's home node 102a . . . c before. The items a user can inspect may be objects published by other users via the Social Web or other items which the user may access in the network 101, particular in web pages. Furthermore, the client may allow the user to provide items with which he wishes to perform an action and which are available in the user device 104*a,b*. Such items may be uploaded or transferred to the user's home node 102*a* . . . *c* from the user device 104*a,b* through the client.

When the user has performed an action corresponding to a predefined verb with an object and to possible further elements of an activity, the home node 102*a* . . . *c* of the user generates an activity including these components. The activity may be generated in connection with performing an operation specified in the activity, or the action may only lead to the generation of an activity without a further operation. The operation may include processing the object, particularly storing the object or preparing the object for publication. For instance, an action for saving the object may lead to an operation for memorizing the object in the home node 102*a* . . . *c* and to the generation of an activity including the verb "share". However, some activities may not involve a further operation of the home node 102*a* . . . *c* besides the generation of the activity.

When an activity is transmitted to another user of the network 101, it is received and processed in the user's home node 102*a* . . . *c*. Controlled by the home node 102*a* . . . *c*, the client of this user may show a message informing about the activity. In this message, the user is informed about the action of the user, i.e. about the object and possible other elements of the activity and the action performed with the object and in connection with the other elements. This also includes providing the user access to the object of the activity. Here, the representation of the object in the activity may be presented in the graphical user interface provided by the client, i.e. the object itself or a link which the user can follow to access the object.

As to the other data elements of the user data access rights may be assigned to activities. The access rights for an activity may be specified by the user. Furthermore access profiles may be stored in the home node 102*a* . . . *c* so that the user does not have to specify the access rights for each single activity. Preferably, the access profiles correspond to rules which assign access rights to activities based on at least one element included in the activity. Thus, access rights of the activity can be defined based on the verb, the object or a further element of the activity. The access profiles may be specified by the user or they may be predetermined in the home nodes 102*a* . . . *c* and/or the clients. Preferably, the user can overwrite the access rights which are assigned to a specific activity using the access profiles.

Every activity may be at least accessed by the user who has initiated the generation of the activity. According to the access profiles an activity with a verb that does not involve making an object available to other users of the network 101 (such as, for example, the verb "store") may only be accessed by the user.

An activity which provides for making its object available to other users may have access rights allowing one or more other user(s) to access the activity. For this purpose access profiles may be defined for making objects of certain types available (only) to certain other user(s) or groups. The user(s) or groups authorized to access the activity may be define based on the relationship data, particular a group may be defined as including the users to which a relationship of certain type exists. For instance, an access profile may provide that a blog post of the user can be accessed without limitation and that published photos are accessible only to the user's "friends" and/or his "kins". However, groups may also be defined independent of the relationship data.

Moreover, as already described in connection with the user profile and relationship data, the access rights may also include further access conditions, such as, for example, a time period for accessing an activity, in addition to the personal access rights.

Another kind of access profiles may allow an owner and/or publisher of an element of an activity to access the activity. This access profile ensures that the publisher of an item has access to actions with or to the item. The element could be the object, target or an in reply-to-element, for example.

Activities generated based on actions of a user of the network 101, may be stored in the user's home node 102*a* . . . *c* such that they can be retrieved by other members of the network 101. The retrieval of such activities is performed similar to the communication of profile data and/or relationship data to other users.

In order to receive activities of a user, the home node 102*a* . . . *c* of another member of the network 101 may send a request for providing activities to the home node 102*a* . . . *c* of the user on behalf of the member. The request may specify the member and may be generated upon an instruction of the member given through his client. The request may be directed to all activities of the user or it may narrow the requested activities using certain criteria. One criterion may be the time period in which the activities have been generated; further criteria may be the type of object included in the activities or a specific target or other extension element included in the activities.

When the user's home node 102*a* . . . *c* has received the request, it determines the activities of the user which are requested. Then, it accesses the access rights linked to these activities and uses the access rights to check whether the member requesting the activities is permitted to access the determined activities. In case the check is affirmative, the requested data items are transmitted to the home node 102*a* . . . *c* of the member who requested the user data. Otherwise the request is rejected.

Furthermore, activities which involve making objects available to other users of the network 101 may be transmitted to other users of the network 101 using a push mechanism. This means that an activity is sent to another user or more other users without a foregoing request of one of those users or their home nodes 102*a* . . . *c* to transmit that activity.

The other user(s) to which an activity is sent using a push mechanism may be specified by the user when generating the activity.

As an alternative, the home node 102*a* . . . *c* may use rules stored therein to determine whether an activity is to be pushed to another user or more other users and to which other user(s) the activity is to be pushed. A rule may provide that all activities may be communicated to one or more other users or the rule may narrow the activities to be pushed to the other user(s) using certain criteria. Thus, a rule includes addressees of the activities falling in the rule and further criteria, if the activities to be covered by a rule are narrowed to selected activities.

Addressees may be single users or groups of users, which may again be specified using the relationship data. Thus, one group may include the users to which a relationship of certain type exists according to the relationship data.

The criteria for selecting activities may be the type of object or further element included in the activities or a specific object, target or other extension element included in the activities. The verb of the generated activities may likewise serve as a criterion for determining whether and to which user(s) activities are sent using the push mechanism.

Thus, using a corresponding rule, it may be specified, for instance, that all activities relation to a posting of objects of certain type, such as, for example, photos, are automatically pushed to certain other users, such as, for example, those users who are identified in the relationship data as "friends".

A user may define the rules for pushing his activities using his client and may store them in his home node $102a \ldots c$. By allowing the user to define rules himself, he can be disburdened from specifying for each activity whether it is to be pushed and to which other users it is to be pushed.

Moreover, rules may be defined by other users, which are also referred to as subscribers herein. For this purpose, another user may define activities he wishes to receive according to criteria of the aforementioned type. The criteria are included in a subscription request generated in the home node $102a \ldots c$ of the respective user. When a subscription request has been generated it is communicated to the home node $102a \ldots c$ of the user whose activities the subscription refers to. Based on the subscription request this node $102a \ldots c$ may store a new rule for pushing activities including the criteria given in the subscription request. As addressee the sender of the subscription request is included in the new rule.

In one embodiment, the node $102a \ldots c$ may also validate an authorization of the party sending the subscription request to make a subscription. The authorization may be confirmed when the sender of the subscription request is included in the relationship data or another contact list of the user account or if the sender is permitted to view at least one data item of the user data. As an alternative, the authorization may be given by the addressee of the subscription request. However, since the access rights for the data items are also observed when activities are pushed, a further check of the authorization of the sender of the subscription request may be dispensed with.

In addition to user-defined and subscription-based rules for pushing activities, there may be further rules, which may be predefined in the network nodes $102a \ldots c$ of the network 101. One such rule may provide that an activity, which includes an element (as the object or as a further element), which is owned or published by another user of the network 101, may be pushed automatically to that user. This ensures that users receive activities which are based on data items they published. In particular, the further element of the activity may be an in-reply-to-element. In this case, the predefined rule may guarantee that a comment or similar that is given with regards to a data item published by certain user will be automatically send to that user.

When there is at least one rule defined in a home node $102a \ldots c$ of a user of the Social Web, an activity is communicated in the following way to another user or more other users of the network 101 (which are called members hereinafter):

When the user has made an action using his client, the home node $102a \ldots c$ of the user generates a corresponding activity in the way described before. Then, the home node $102a \ldots c$ of the user compares the generated activity with the rules for pushing activities which are stored in the home node $102a \ldots c$. In this process, the home node $102a \ldots c$ determines the rules which cover the activity, i.e. the rules including a criterion the activity fulfills. When at least one such rule is determined, the home node $102a \ldots c$ ascertains the members to which the activity is to be communicated according to the determined rules. Of course, there may also be more than one rule covering a single activity.

Upon identification of the members to which the activity is to be pushed, the home node $102a \ldots c$ of the user preferably accesses the access rights stored therein and ascertains, whether the determined members are authorized to access the activity. With regards to the rules for pushing activities to other members, the access rights may be observed substantially in the same way as if members retrieve activities or other user data of the user. Thus, it may be possible that a member determined as a recipient of an activity based on a rule does not have permission to access the activity. In the process of checking the access rights of the determined members, the home node $102a \ldots c$ identifies those members who are permitted to access the activity. To those members the activity is then communicated by the user's home node $102a \ldots c$ through the network 101.

The activity pushed by the home node $102a \ldots c$ of the user is received in the home nodes $102a \ldots c$ of the members specified in the rules. When such a home node $102a \ldots c$ receives the activity, the member to which the activity is addressed, is informed that a new activity has been received and the action described by the activity is presented to the member by his client.

As described before, activities can be made available to other users of the network in a push mechanism in contrast to profile data and relationship data. Therefore, in one embodiment, changes in the profile data and/or relationship data of one user are pushed to other members of the network 101 using activities. Thereby, the contacts of a user can be informed about a change of the personal details of the user easily and quickly.

In particular, when the user changes his profile data, which may be the case, when he moves or changes his place of work, for example, an activity is generated. The activity may include a dedicated verb indicating that the user changed his profile or one of the aforementioned verbs for publishing information may be used. The object of the activity may be the new data entry of the profile. In addition, the former data entry which is replaces may also be added to the activity as an object or extension element. When the relationship data of the user is changed due to the creation of a new relationship or due to a termination of an existing relationship, likewise an activity may be generated. Such an activity may again include verbs dedicated to changes in relationship data or a verb for publishing an event may be used.

The activity may be generated automatically by the home node $102a \ldots c$ of the user, if the profile data and/or relationship data are changed. The activity may be pushed to other users of the network 101 automatically according to a rule stored in the home node $102a \ldots c$ of the user, or the user may select the recipients of the activity manually. Members of the network 101 to which the activity has not been pushed, may be informed about the change in the user's profile data and/or relationship data, when they retrieve the activities of the user.

Furthermore, activities may be used to create relationships between users of the network 101. In particular, a first user may send a corresponding activity to a second user, when he wishes to establish a relationship of certain type to the second user, which requires his confirmation. For instance, the verb of the activity may indicate that a relationship is to be created and the object may be an indication of the type of relationship. The second user may give the confirmation by creating a further activity which is transmitted to the first user. The verb of this activity may indicate that the relationship is confirmed and the object may again be an indication of the relationship and its type, for example. The sending of the activity may lead to the creation of a data item reflecting the new relationship item in the relationship data of the second user. The retrieval of the confirmation activity in the home node $102a \ldots c$ of the first user may trigger the addition of a data item reflecting the relationship in the relationship data of the first user.

In the network 101 described before, social interactions are based on the communication between network nodes 102a . . . c to which users are assigned. Here, to one network node 102a . . . c only one user may be assigned. This allows each user to operate his network node 102a . . . c in order to use the Social Web. However, there may also be network nodes 102a . . . c to which a plurality of users can be assigned. These network nodes 102a . . . c may allow for interactions between the assigned users, which is independent of the communication in the network 101. In particular, the interaction between the users may not be based on the communication protocol and the data model described before.

If one network node 102a . . . c provides for internal interactions based on a different communication protocol and/or data model, it may be connected to the network 101 via a translator module 105. In FIG. 1 this is shown for the network node 102c, which provides a social network site for a plurality of users accessing the network node 102c using client devices 106a . . . c (by way of example three client devices 106a . . . c are shown although more users may access the social network site). The translator module 105 is configured to translate data items of the internally used data format into data items of the aforementioned data formats used in the Social Web. In particular, it is configured to generate activities from the corresponding data items which are internally used for describing actions of users. Furthermore, it is configured to communicate with other network nodes 102a,b using the communication protocol used in the network 101.

By using a translator module 105 of the type described before, it is particularly possible to integrate existing social network sites into the network 101, which provide a service for social interactions between registered users based on a proprietary data formats and communication protocols for the internal communication.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

What is claimed is:

1. A system for social interactions between users, the system having a plurality of network nodes connected in a network, each node comprising a representation of at least one assigned user, the system comprising:
   a first node assigned to a first user, the first node being adapted to generate an activity upon an execution of an action of the first user with a data object in interaction with the first node, wherein the first user has joined a social network site provided by the first node, and wherein the action is associated with the social network site provided by the first node;
   the activity describing the action in a predetermined format and including a representation of the data object the action of the user is performed with; and
   the first node being further adapted to link the activity to at least one second user and to communicate the activity to at least one second node to which the second user is assigned, wherein a communication protocol for transmitting the activity to the second node is based on the Extensible Messaging and Presence Protocol, the communication protocol being an extension of the Extensible Messaging and Presence Protocol, and wherein the first node comprises a plurality of user accounts as a social network site and is configured to generate a notification of the action of the first user for communication to at least one user account, and the first node further comprising a translator module adapted to generate the activity from the notification, while the translator module uses another data format or communication protocol for internal data exchange between its users allowing the social network site provided by the first node to internally maintain its existent data format or communication protocol, wherein the at least one user account is not associated with the social network site provided by the first node.

2. The system recited in claim 1, wherein the activity further comprises a verb describing an operation executed with the object.

3. The system recited in claim 1, wherein the first node is adapted to link the activity to the second user based on a specification of the second user by the first user.

4. The system recited in claim 1, wherein the first node is configured to determine the second user using a rule stored in the first node, the rule linking the action to the second user based on the object and/or the verb.

5. The system recited in claim 1, wherein the action of the user relates to a data object accessible in the network and the first node being configured to link the activity to a publisher and/or owner of the data object.

6. The system recited in claim 1, wherein a rule is provided by the first user and/or by the second user, the second user having transmitted a subscription request to the first node through the second node for providing the rule.

7. The system recited in claim 1, wherein the representation of an assigned user comprises a profile of the assigned user including information on the assigned user and/or the representation of an assigned user comprises relationship data, the relationship data including identification information of further users to which the assigned user has a relationship.

8. The system recited in claim 1, wherein the first node is adapted to create a corresponding activity when the profile and/or the relationship data of the first user are changed.

9. The system recited in claim 1, wherein first node is configured to transmit the activity to the second node upon request of the second node after an authorization of the second user to receive the activity has been verified in the first node, the authorization being specified in the activity.

10. The system recited in claim 1, wherein the activity includes at least one recipient user, the first node being configured to transmit the activity to the recipient user, and wherein the activity further comprises information specifying the users being authorized to access the activity.

11. The system recited in claim 1, wherein the first node is adapted to transmit the activity to the second node after having authenticated the second node.

12. The system recited in claim 1, wherein to each node at least one client unit is assigned, the client unit being used by the assigned user to access the node.

13. A method for social interactions between users, one of a plurality of network nodes being assigned to each user, the nodes being connected in a network, the method comprising:

generating an activity in a first node assigned to a first user, when the first user executes an action with a data object in interaction with the first node, wherein the first user has joined a social network site provided by the first node, and wherein the action is associated with the social network site provided by the first node, and wherein the activity describing the action in a predetermined format and comprising a representation of the object the action of the user is performed with;

linking the activity to at least one second user; and communicating, with the first node, the activity to at least one second node to which the second user is assigned, wherein a communication protocol for transmitting the activity to the second node is based on the Extensible Messaging and Presence Protocol, the communication protocol being an extension of the Extensible Messaging and Presence Protocol, and wherein the first node comprises a plurality of user accounts as a social network site and is configured to generate a notification of the action of the first user for communication to at least one user account, and the first node further comprising a translator module adapted to generate the activity from the notification, while the translator module uses another data format or communication protocol for internal data exchange between its users allowing the social network site provided by the first node to internally maintain its existent data format or communication protocol, wherein the second user is not associated with the social network site provided by the first node.

14. A system for social interactions between users, one of a plurality of network nodes being assigned to each user, the nodes being connected in a network, the system comprising:

means for generating an activity in a first node assigned to a first user, when the first user executes an action with a data object in interaction with the first node, wherein the first user has joined a social network site provided by the first node, and wherein the action is associated with the social network site provided by the first node, and wherein the activity describes the action in a predetermined format and comprises a representation of the object;

means for linking the activity to at least one second user; and means for communicating the activity to at least one second node to which the second user is assigned, wherein a communication protocol for transmitting the activity to the second node is based on the Extensible Messaging and Presence Protocol, the communication protocol being an extension of the Extensible Messaging and Presence Protocol, and wherein the first node comprises a plurality of user accounts as a social network site and is configured to generate a notification of the action of the first user for communication to at least one user account, and the first node further comprising a translator module adapted to generate the activity from the notification, while the translator module uses another data format or communication protocol for internal data exchange between its users allowing the social network site provided by the first node to internally maintain its existent data format or communication protocol, wherein the second user is not associated with the social network site provided by the first node.

* * * * *